United States Patent
Anderson et al.

(10) Patent No.: US 6,721,423 B1
(45) Date of Patent: Apr. 13, 2004

(54) LOST COST COUNTERMEASURES AGAINST COMPROMISING ELECTROMAGNETIC COMPUTER EMANATIONS

(76) Inventors: Ross J. Anderson, 10 Water End, Wrestlingworth, Sandy, Bedfordshire (GB), SG29 2HA; Markus Guenther Kuhn, Schlehenweg 9, Uttenreuth (DE), D-91080

( * ) Notice: Subject to any disclaimer, the term of this patent is extended or adjusted under 35 U.S.C. 154(b) by 0 days.

(21) Appl. No.: 09/238,560

(22) Filed: Jan. 28, 1999

(51) Int. Cl.[7] .................................................. H04L 9/00
(52) U.S. Cl. ........................ 380/252; 380/268; 380/210; 380/54
(58) Field of Search ............................... 380/205, 210, 380/268, 287, 22, 1, 252, 54; 713/190, 189

(56) References Cited

U.S. PATENT DOCUMENTS

| | | | | |
|---|---|---|---|---|
| 3,770,269 A | * | 11/1973 | Elder | ........................... 463/18 |
| 4,203,102 A | * | 5/1980 | Hydes | ......................... 345/467 |
| 4,695,904 A | | 9/1987 | Shinyagaito et al. | |
| 5,379,343 A | | 1/1995 | Grube et al. | |
| 5,530,390 A | * | 6/1996 | Russell | ........................ 327/164 |
| 5,726,538 A | * | 3/1998 | Jackson et al. | ............. 315/370 |
| 5,894,517 A | * | 4/1999 | Hutchison et al. | .......... 380/268 |

OTHER PUBLICATIONS van Eck, "Electromagnetic Radiation for Video Display Units: An Eavesdropping Risk?" *Computers and Technology* 4 (1985) 269–286.

* cited by examiner

*Primary Examiner*—Gilberto Barrón
*Assistant Examiner*—G Gurshman

(57) ABSTRACT

A set of methods is specified whereby software reduces compromising electromagnetic emanations of computers that could otherwise allow eavesdroppers to reconstruct sensitive processed data using periodic averaging techniques. Fonts for screen display of text are low-pass filtered to attenuate those spectral components that radiate most strongly, without significantly affecting the readability of the text, while the character glyphs displayed are chosen at random from sets that are visually equivalent but that radiate differently. Keyboard microcontroller scan loops are also furnished with random variations that hinder reconstruction of the signal emanated by a keyboard. Drivers for hard disks and other mass-storage devices ensure that the read head is never parked over confidential data longer than necessary.

3 Claims, 3 Drawing Sheets

LOST COST COUNTERMEASURES AGAINST COMPROMISING ELECTROMAGNETIC COMPUTER EMANATIONS

TECHNICAL FIELD

This invention is related to the protection of confidential computer data against eavesdroppers who try to reconstruct it from the electromagnetic emanations generated by computers.

BACKGROUND OF THE INVENTION

It has been known to military organizations since at least the early 1960s that computers generate electromagnetic radiation which not only interferes with radio reception, but which also makes information about the processed data available to a remote radio receiver (see for example Peter Wright: Spycatcher—The Candid Autobiography of a Senior Intelligence Officer. William Heinemann Australia, 1987, ISBN 0-85561-098-0). Known as compromising emanation or Tempest radiation, this electromagnetic broadcast of data has been a significant concern in security-sensitive computer applications. Compromising emanations of video display units (see for example Wim van Eck: Electromagnetic Radiation from Video Display Units: An Eavesdropping Risk? Computers & Security vol 4 (1985) 269–286; Erhard Möller, Lutz Bernstein, Ferdinand Kolberg: Schutzmaβ nahmen gegen kompromittierende elektromagnetische Emissionen von Bildschirmsichtgeräten [Protective measures against compromising electromagnetic emissions from video display terminals]. Labor für Nachrichtentechnik, Fachhochschule Aachen, Aachen, Germany) and serial data cables (see Peter Smulders: The Threat of Information Theft by Reception of Electromagnetic Radiation from RS-232 Cables. Computers & Security vol 9 (1990) 53–58) have been described in the open literature. One common and expensive countermeasure is to fit metallic shielding to the device, the room, or the entire building (see Electromagnetic Pulse (EMP) and Tempest Protection for Facilities. Engineer Pamphlet EP 1110-3-2, 469 pages, U.S. Army Corps of Engineers, Publications Depot, Hyattsville, Dec. 31, 1990; and Deborah Russell, G. T. Gangemi Sr.: Computer Security Basics. O'Reilly & Associates, 1991, ISBN 0-937175-71-4). Cross-correlation test methods suitable for verifying the effectiveness of such shielding have been described in Wolfgang Bitzer, Joachim Opfer: Schaltungsanordnung zum Messen der Korrelationsfunktion zwischen zwei vorgegebenen Signalen [Circuit arrangement for measuring the correlation function between two given signals]. German Patent DE˜3911155˜C2, Deutsches Patentamt, Nov. 11, 1993, and Joachim Opfer, Reinhart Engelbart: Verfahren zum Nachweis von verzerrten und stark gestörten Digitalsignalen und Schaltungsanordnung zur Durchführung des Verfahrens [Method for the detection of distorted and strongly interfered digital signals and circuit arrangement for implementing this method]. German Patent DE˜4301701˜C1, Deutsches Patentamt, May 5, 1994. Devices that generate a correlated jamming signal in order to make eavesdropping more difficult have been described in John H. Dunlavy: System for Preventing Remote Detection of Computer Data from TEMPEST Signal Emissions. U.S. Pat. No. 5,297,201, Mar. 22, 1994, and Lars Hoivik: System for Protecting Digital Equipment Against Remote Access. U.S. Pat. No. 5,165,098, Nov. 17, 1992.

The electromagnetic data-dependent signals generated by computers and emanated over the air, or via power supply and communication cables, are rather weak and distorted. In addition, if several computers are located in close proximity, their signals will be overlaid. The eavesdropper will therefore use various techniques to separate the signals of interest from the background noise before attempting further decoding (see Markus G. Kuhn, Ross J. Anderson: Soft Tempest: Hidden Data Transmission Using Electromagnetic Emanations, in David Aucsmith (Ed.): Information Hiding, Second International Workshop, IH'98, Portland, Oreg., USA, Apr. 15–17, 1998, Proceedings, LNCS 1525, Springer-Verlag, ISBN 3-540-65386-4, pp. 126–143). Periodic averaging is a very powerful noise elimination technique and can be applied to many signals of particular interest from computer systems that process confidential data. If the signal of interest $s(t)$ has a known period T such that $s(t)=s(t+T)$ most of the time, then the eavesdropper can reconstruct from the received noisy signal $r(t)=s(t)+n(t)$, where $n(t)$ is uncorrelated background noise, a noise-reduced estimate of the signal from a moving average:

$$\zeta(t) = \frac{1}{n_2 - n_1 + 1} \sum_{i=n_1}^{n_2} s(t + iT) \text{ for } 0 \leq t < T$$

which has a significantly better signal-to-noise ratio than $s(t)$.

Three periodic signals found in a typical computer may contain confidential information and are thus of particular interest to an eavesdropper:

1. The video display signal is generated by writing the content of the display frame buffer to the display with a period equivalent to the vertical refresh frequency of the cathode-ray tube, liquid crystal panel, or other display device.
2. A microcontroller or a specialized circuit in the keyboard applies voltages in succession to each row of a matrix circuit to which the keys are connected. Scanning the column lines for this voltage allows the microcontroller or specialized circuit to determine which key is currently pressed in order to report the appropriate key code word to the main processor (see Ed L. Sonderman, Walter Z. Davis: Scan-controlled keyboard, U.S. Pat. No. 4,277,780, Jul. 7, 1981). This scan cycle is repeated with high frequency to ensure that no key-press events are missed. The sequence of instructions executed in the scan loop often depends on which key is currently pressed. Therefore the precise shape of the emanations reveals information about key presses, and manually entered text may be reconstructed by an eavesdropper.
3. In most mass storage devices such as magnetic or magneto-optical discs, data is organized into storage tracks and a motor moves the head between them. After data has been read from or written to a track, the head usually remains located on that track until a request to access another track is received. During this time, the readout amplifier receives, amplifies and emits the data content of the storage track periodically, where the period is identical to the rotation time of the disk.

SUMMARY OF THE INVENTION

The present invention is a low-cost means of making it more difficult for an eavesdropper to gain knowledge about the data processed on a normal computer system that features standard components such as a video display, a keyboard and a hard disk. In its most general terms the presents invention proposes that instead of, or in addition to, physical screening of an electronic system, the system should be designed or modified to reduce (or substantially eliminate) the generation of electromagnetic signals which are periodic or otherwise predictable.

Accordingly, the invention may be expressed as a method of obstructing the reconstruction of information contained in an electronic apparatus from electromagnetic emissions, by reducing the energy of certain periodic signals in electromagnetic emissions generated by the system and destroying the periodicity of residual signals or other signals.

These methods may involve only software or firmware changes in the computer system and can therefore be implemented at a much lower cost than the conventional techniques described above, in which electromagnetic radiation is reabsorbed after it has been generated (i.e. physical shielding). They may also be implemented using low-cost hardware devices. Whether they are implemented in software, firmware or hardware, these techniques can also be combined with traditional physical shields in order to provide an independent layer of protection against shield failure.

The general means of protection is to render signals more difficult for an attacker to recover using periodic averaging and cross-correlation techniques. Three specific methods are filtering out from periodic signals those spectral components that cause the highest levels of compromising radiation, spreading the spectrum of the residual information-bearing radiation using a sequence unknown to the attacker, and removing periodic signals directly. We will describe examples of these three techniques in turn.

An example of the first method consists of displaying text on the video display device using a special font that employs a plurality of pixel luminosities in order to represent character glyphs. The use of more than two pixel luminosities to display anti-aliased characters and thus avoid staircase effects in slanted lines and italic characters has been described in Richard B. Preiss, John C. Dalrymple: System and method for smoothing the lines and edges of an image on a raster-scan display, U.S. Pat. No. 4,672,369, Jun. 9, 1987, and Bradley J. Beitel, Robert D. Gordon, Joseph B. Witherspoon III: Anti-alias font generation, U.S. Pat. No. 5,390,289, Feb. 14, 1995}. The innovation in the present invention is to use a font specially designed so that the horizontal spatial frequency spectrum of the glyphs is adapted to the emission spectrum of the video display device so as to reduce the broadcast energy and thus minimize the range within which eavesdroppers can identify the displayed characters.

An example of the second method consists, firstly, of using a random number generator to select one of a number of character glyphs which are visually similar but which are generated by different video signals, in order to make it more difficult to reconstruct the signal using signal processing techniques; and secondly, introducing a variable delay into the keyboard matrix scan cycle, which makes it harder for eavesdroppers to reconstruct the compromising emissions of the keyboard. The innovation in the present invention is to randomise the inadvertently emitted signal and thus make its reconstruction by an attacker more difficult.

An example of the third method is to modify the device driver software or controller firmware responsible for the control of disk drives, or in general any mass storage device that uses moveable read/write heads to access a plurality of storage tracks on the surface of a storage medium. The innovation in the present invention is to park inactive read/write heads on a storage track that does not contain confidential data.

DETAILED DESCRIPTION

Figure 1:
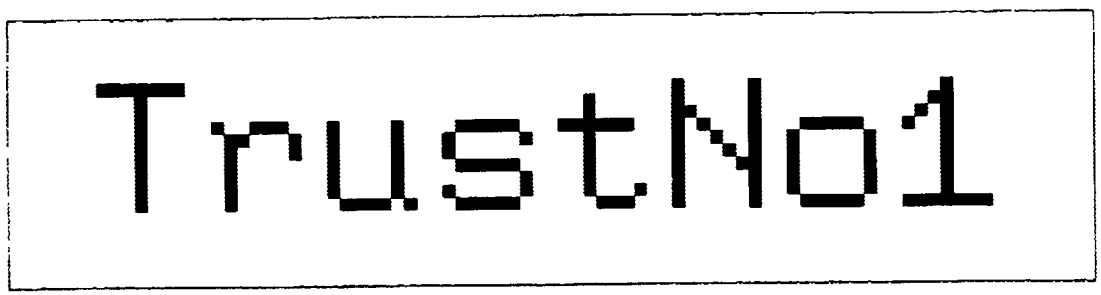
FIG. 1 shows a pixel field containing normal raster text.

In the case of the video display unit, we shape the spectrum of the periodic video signal by using digital filtering or by combining digital filtering and anti-aliasing techniques to generate a character font with little spectral energy in those frequency ranges in which the computer monitor radiates particularly well. The spectral characteristics of the monitor are first determined by using the graphics adapter of the computer to display test images such as a zoneplate pattern. The emanations are then measured in an electromagnetic compatibility laboratory using a spectrum analyzer or a Tempest monitoring receiver. In one test system described in Markus G. Kuhn, Ross J. Anderson "Soft Tempest: Hidden Data Transmission Using Electromagnetic Emanations" (in David Aucsmith (Ed.): Information Hiding, Second International Workshop, IH'98, Portland, Oreg., USA, Apr. 15–17, 1998, Proceedings, LNCS 1525, Springer-Verlag, ISBN 3-540-65386-4, pp. 126–143) these measurements showed that for a video mode with 95 MHz pixel frequency, most of the emitted energy came from parts of the test image with frequencies in the range 33–47.5 MHZ. The emitted energy was not only present in this frequency range but also as higher harmonics of frequencies in this band.

Preferably, the present invention reduces the amount of emitted information bearing radiation by at least 10 dB, or more preferably by at least 20 dB or even 30 dB. This is because in the zoning model used by many governments to decide which classification of information may be processed on which type of apparatus in which zone of a building, a signal attenuation of 10 dB corresponds to a single zone (see Deborah Russell, G. T. Gangemi Sr.: Computer Security Basics. O'Reilly & Associates, 1991, ISBN 0-937175-71-4). Text displayed with a font in which all horizontal pixel lines have been processed with a digital filter to attenuate frequency components in this range by about 20 dB becomes practically invisible on a Tempest monitor while the display quality and readability of the text by persons in front of the authorised display device is only marginally affected. This processing can be achieved by passing the video signal through a suitable hardware filter, or more conveniently by software graphic processing.

In our typical embodiment, we start out with a high-resolution version of a character font and generate grey-level pixel images of the glyphs, selecting for the background and foreground luminosity 85% and 15% of the available maximal white luminosity in order to prevent overflow or underflow during subsequent filtering. We then apply a normal subsampling filter in both horizontal and vertical directions in order to prevent aliasing by removing all frequency components that are above the Nyquist limit of the final pixel spacing. Our innovation over existing anti-aliasing technology is to apply in the horizontal direction a further filter that attenuates those frequencies at which the video display device radiates compromising RF emanations efficiently. The spectral shape of the anti-emission filter depends on the results of the monitor emission measurements and on a signal energy versus display quality tradeoff.

Figure 2:
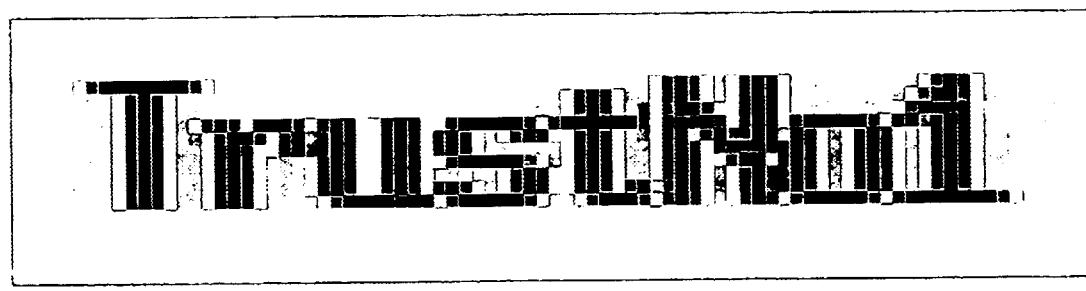
FIG. 2 shows a pixel field containing horizontally low-pass filtered raster text, illustrating the application of the second emanation protection method described in this invention.
Figure 3:
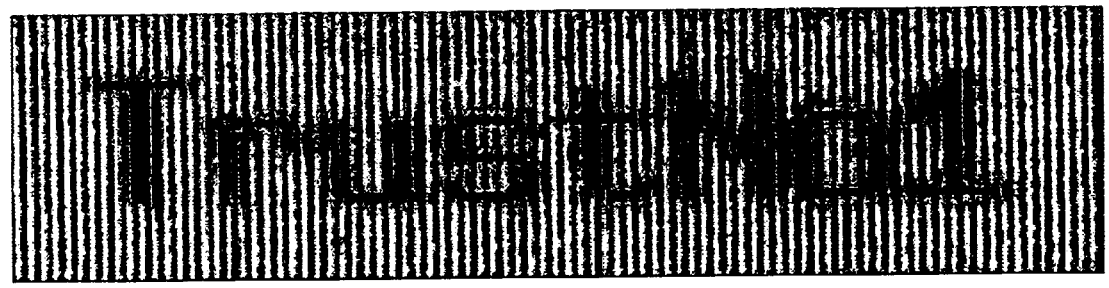
FIG. 3 shows a magnified photograph of the pixel field in FIG. 1 as it is displayed on a cathode-ray computer monitor.
Figure 4:
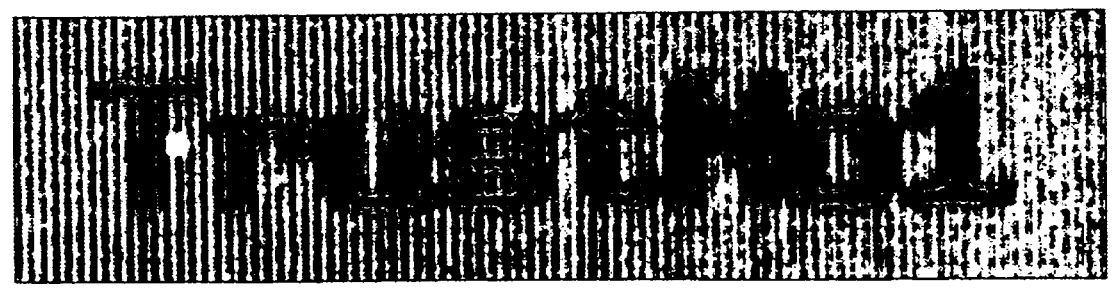
FIG. 4 shows a magnified photograph of the pixel field in FIG. 2 as it is displayed on a cathode-ray computer monitor.
Figure 5:
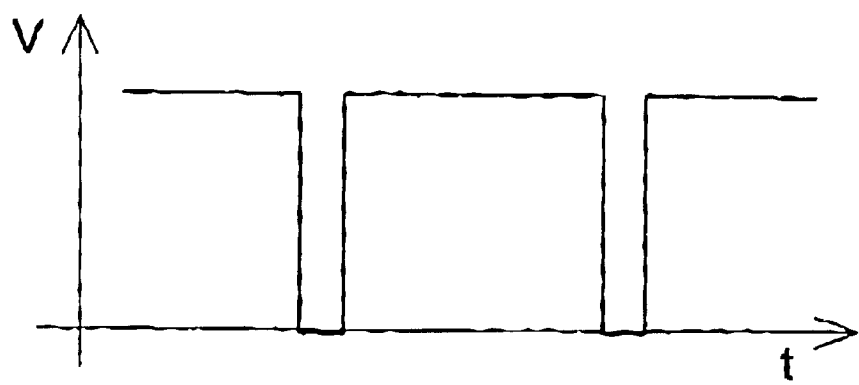
FIG. 5 shows an excerpt from the video signal generated by the pixel field shown in FIG. 1.
Figure 6:
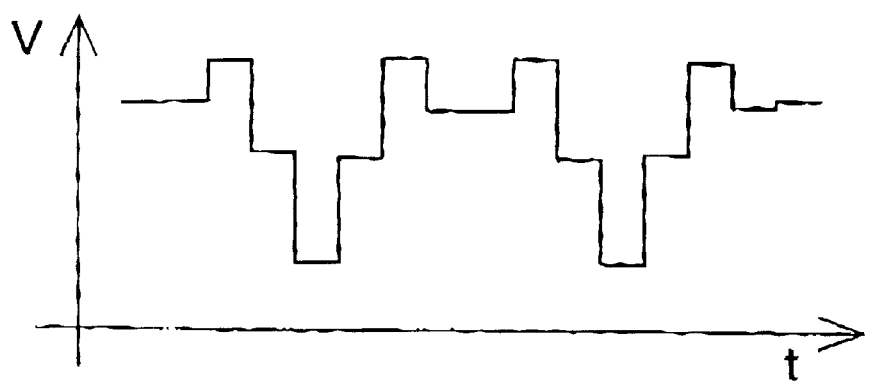
FIG. 6 shows an excerpt from the video signal generated by the pixel field shown in FIG. 2, taken from the same pixel coordinates as those used in FIG. 5.
Figure 7:
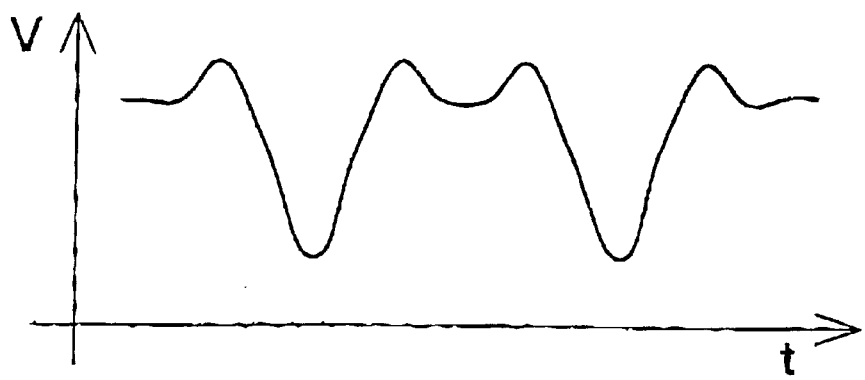
FIG. 7 shows the video signal from FIG. 6 after it has passed a simple analog low-pass filter that has been installed on the computer video adapter output in order to attenuate the aliasing frequencies generated by the discrete nature of the video signal and by the shape of a single pixel pulse.

After these filtering steps, the filtered high-resolution font is subsampled and stored for use by display routines. The resulting filtered glyphs may be significantly wider than the underlying original glyphs and thus the display routine must superpose them using addition, with the background (85%) luminosity treated as zero for the purpose of this addition. An example text that has been generated this way is shown in FIG. 2 as a pixel field and in FIG. 4 as a CRT screen photograph. FIG. 6 shows a typical video signal generated this way, from which further harmonics can be removed by an analog filter at the video adapter output, resulting in a smoother signal such as that shown in FIG. 7. For best performance, a 30 MHz low-pass hardware filter is used; if the application admits only software countermeasures, then the filters installed in monitor cables for EMC and RFI compliance purposes together with the natural inductance of the cables and the limitations of the video amplifier circuitry have a similar if less controlled effect.

Figure 8:
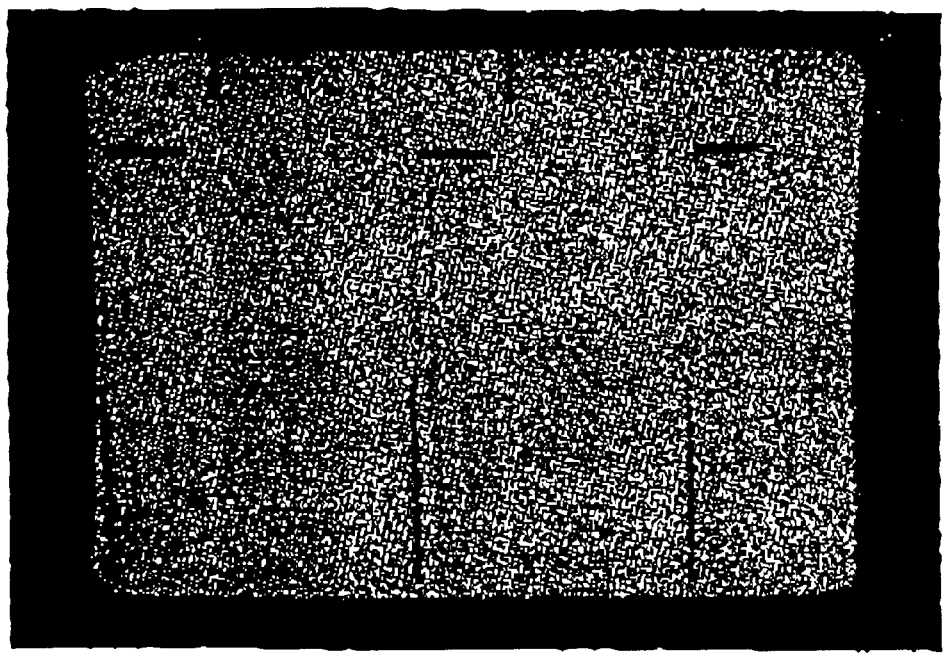
FIG. 8 shows a photograph of the screen of a Tempest eavesdropping receiver when the computer screen under surveillance contains normal raster text fonts as shown in FIG. 1.
Figure 9:
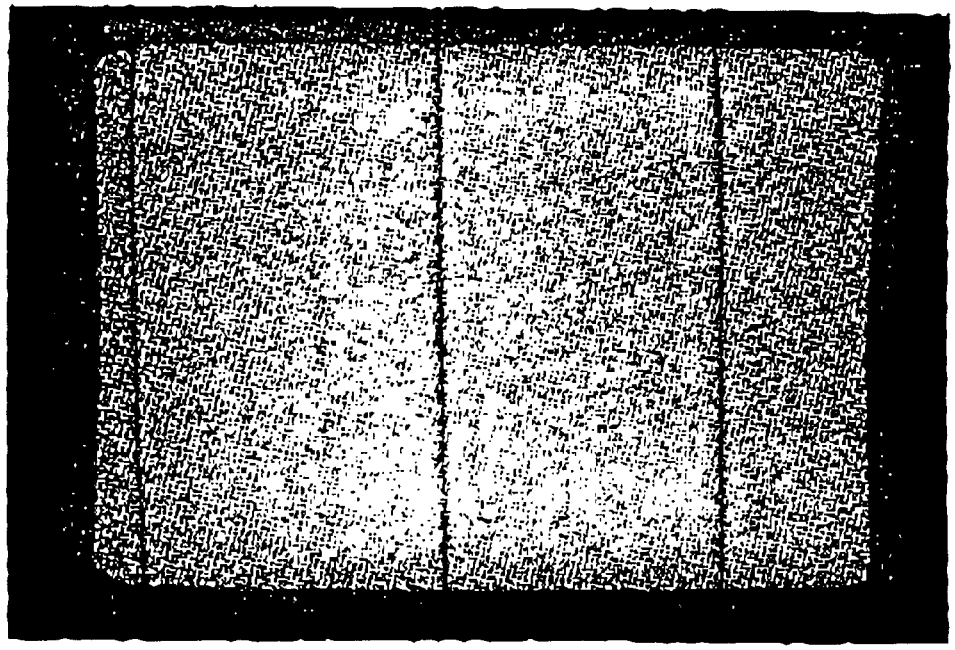
FIG. 9 shows a photograph of the screen of a Tempest eavesdropping receiver when the computer screen under surveillance contains horizontally low-pass filtered content as shown in FIG. 2, demonstrating the protective effect of this invention.

FIG. 9 shows the signal received by the eavesdropping receiver described in Markus G. Kuhn, Ross J. Anderson "Soft Tempest: Hidden Data Transmission Using Electromagnetic Emanations" (in David Aucsmith (Ed.): Information Hiding, Second International Workshop, IH'98, Portland, Oreg., USA, Apr. 15–17, 1998, Proceedings, LNCS 1525, Springer-Verlag, ISBN 3-540-65386-4, pp. 126–143), when the screen content has been low-pass filtered using software only as described by this invention. FIG. 1, FIG. 3, FIG. 5, and FIG. 8 illustrate the corresponding situation found with normal video display units if no protective filtering takes place; this gives a considerably better received signal as shown in FIG. 8.

To further complicate automated radio frequency character recognition of displayed text using a digital eavesdropping receiver and pattern matching techniques, one typical embodiment utilizes a plurality of fonts that differ slightly in character style, size, and position and it randomly selects for every character of the displayed text one of these font variations.

In the case of the keyboard scan cycle, we adapt the same idea and spread the spectrum of the emanations by adding a variation and a random delay into the scan sequence. Transforming the scan cycle into a non-periodic process spreads the harmonics of the sample cycle frequency in the spectrum such that they cannot be extracted easily by periodic averaging. The random repetition delay between the application of voltages to the rows of the keyboard matrix is accomplished both by varying the order in which rows are scanned and by using delay loops to vary slightly the time that passes between the scan of one row and the next.

The choice of row order and delays depends on the output of a cryptographically strong random number generator that is periodically reseeded by combining its old internal state with keyboard input so as to make its output unpredictable to an eavesdropper. Cryptographic random number generators are described in Bruce Schneier: Applied Cryptography (John Wiley & Sons Inc, 1996, ISBN 0-471-11709-9). The emitted spectrum of the keyboard scan microcontroller and other processors in general can also be spread by slightly frequency modulating the clock signal of this processor using a random noise source, which creates an additional difficulty for eavesdropping receivers. Finally, the scan codes are encrypted for transmission along the keyboard cable to the computer in order to prevent direct eavesdropping of the serial cable emanations as described in Peter Smulders: The Threat of Information Theft by Reception of Electromagnetic Radiation from RS-232 Cables (Computers & Security vol 9 (1990) 53–58).

In the case of the mass storage device, we could also reduce the readability of confidential data in the unavoidable periodic signal that the read amplifiers generate as the device turns, by moving the disk head in a random or pseudorandom manner when it is not in use. However in this case there is available a simpler and deterministic remedy which imposes less mechanical wear on the device. We simply move the read head as soon as possible away from a sensitive track if no further read requests are pending. In our preferred implementation, the head is always moved to safe tracks—tracks that contain either no data at all or non-sensitive data—during disk idle times. The disk driver maintains a list of safe tracks to which the writing of sensitive data is prevented, and where there are a number of mechanically coupled heads to access stacked or otherwise juxtaposed media, there will be allocated a number of sets of safe tracks corresponding to disk head positions at which the writing of sensitive data is similarly not permitted.

Whenever the request queue for a device is empty and the last access was to a sector other than on a safe track, the driver will determine the closest safe track and either move the read head there directly or issue a read instruction to one of the sectors in this track depending on the disk interface. This way, the sensitive data content of the hard disk will only be amplified for the minimal necessary time and the probability that an eavesdropper can successfully reconstruct any of it by periodic averaging is significantly reduced.

What is claimed is:

1. A method of obstructing the reconstruction of information shown on a video-display system from electromagnetic emissions generated by that system, in which the display is altered using character fonts that compose each displayed graphic character using more than two pixel amplitudes in order to reduce the electromagnetic emissions in video-signal frequencies that are radiated or conducted to potential eavesdropper receiver positions particularly well.

2. A method of obstructing the reconstruction of information shown on a video-display system from electromagnetic emissions generated by said video-display system comprising: generating several character fonts consisting of pixel images of glyphs; each of said fonts providing a glyph image for each graphic character of a supported character set, said character set being common across all generated fonts; each of said glyph images differing slightly in style, size, position and quantization noise from glyph images that represent the same character in the other generated fonts responsive to monitored emission measurements and subject to a trade-off that keeps the differences in visual appearance at a minimum and that maximizes the differences in electromagnetic emissions in video-signal frequencies that are radiated or conducted to a potential eavesdropper receiver, and a mechanism to alter said video display by randomly choosing among said fonts for each newly displayed instance of a character.

3. A method of obstructing the reconstruction of information shown on a video-display system from electromagnetic emission generated by said video-display system comprising: generating character fonts consisting of grey-level pixel images of glyphs; filtering said generated character fonts in a horizontal direction responsive to monitored emission measurements and a signal-energy to display-quality trade-off, and altering said video display by using character fonts that compose displayed characters using more than two pixel amplitudes for reducing the electromagnetic emissions in video-signal frequencies that are radiated or conducted to a potential eavesdropper receiver.

* * * * *